(12) United States Patent
Hsing et al.

(10) Patent No.: US 10,800,666 B2
(45) Date of Patent: Oct. 13, 2020

(54) FILTRATION SYSTEM AND REPLACEMENT METHOD THEREOF

(71) Applicant: PLAINLIV TAIWAN CO., LTD., Taichung (TW)

(72) Inventors: Kai-Chih Hsing, Taichung (TW); Wen-Yi Huang, Taichung (TW)

(73) Assignee: PLAINLIV TAIWAN CO., LTD., Taichung (TW)

( * ) Notice: Subject to any disclaimer, the term of this patent is extended or adjusted under 35 U.S.C. 154(b) by 212 days.

(21) Appl. No.: 15/995,914

(22) Filed: Jun. 1, 2018

(65) Prior Publication Data

US 2018/0346345 A1    Dec. 6, 2018

(30) Foreign Application Priority Data

Jun. 5, 2017 (TW) .............................. 106118532 A

(51) Int. Cl.
*C02F 1/00*     (2006.01)
*B01D 35/30*    (2006.01)

(52) U.S. Cl.
CPC ............ *C02F 1/003* (2013.01); *B01D 35/303* (2013.01); *B01D 2201/4023* (2013.01); *C02F 2201/006* (2013.01)

(58) Field of Classification Search
CPC .... B01D 25/002; B01D 25/02; B01D 25/122; B01D 25/215; B01D 63/08; B01D 63/082; B01D 63/084; B01D 35/303; B01D 2201/4023; B01D 35/30; B01D 35/301; B01D 35/306; C02F 1/003; C02F 2201/006
See application file for complete search history.

(56) References Cited

U.S. PATENT DOCUMENTS

2006/0043021 A1\* 3/2006 Pesakovich ............ B01D 61/20
                                                           210/650
2007/0241048 A1\* 10/2007 Hunt .................... B01D 63/082
                                                           210/450

FOREIGN PATENT DOCUMENTS

| CN | 200977437 Y | 11/2007 |
| CN | 105867146 A | 8/2016 |
| CN | 106621540 A | 5/2017 |
| TW | I522158 B | 2/2016 |

OTHER PUBLICATIONS

Merriam Webster Online Dictionary Definition of "hook", Accessed Apr. 27, 2020. (Year: 2020).\*

\* cited by examiner

*Primary Examiner* — David C Mellon
(74) *Attorney, Agent, or Firm* — Rabin & Berdo, P.C.

(57) ABSTRACT

A filtration system has a filter unit and a holder module. The filter unit has an inlet side and an outlet side being opposite each other, and has at least one filter module. The holder module has at least one holder element and two tightening assemblies. The at least one holder element fixes the at least one filter module, and the tightening assemblies are respectively mounted at the inlet side and the outlet side of the filter unit. The quantities of the filter modules of the filter unit may be increased or decreased.

4 Claims, 7 Drawing Sheets

FILTRATION SYSTEM AND REPLACEMENT METHOD THEREOF

BACKGROUND OF THE INVENTION

1. Field of the Invention

The present invention relates to a water purification installation, and more particularly to a filtration system and a replacement method thereof.

2. Description of Related Art

A conventional water purification installation is usually sold as a complete set. The conventional water purification installation has filters and a holder for fixing the filters, and the holder of the conventional water purification installation has a certain number of holes or fixed portions for assembling and replacing the filters. Corresponding to the holder, the quantities of the filers are limited and could not be increased or decreased by demand of a user, and the assembled positions of the filters could not be adjusted.

To overcome the shortcomings, the present invention tends to provide a filtration system and a replacement method thereof to mitigate or obviate the aforementioned problems.

SUMMARY OF THE INVENTION

The main objective of the invention is to provide a filtration system and a replacement method thereof, wherein the quantities of filter modules of a filter unit may be increased or decreased, and the assembling or the replacement method of the filter modules is easy and fast.

The filtration system in accordance with the present invention comprises a filter unit and a holder module.

The filter unit has an inlet side, an outlet side being opposite the inlet side, and at least one filter module. Each one of the at least one filter module respectively has a housing having two sides, a filter mounted inside the housing, a hook assembly formed in a top side of the filter module, a first connecting surface formed on one of the sides of the housing, and a second connecting surface formed on the other side of the housing and being parallel to the first connecting surface.

The holder module fixes the filter unit, and has at least one holder element and two tightening assemblies. The at least one holder element fixes the filter unit and is connected with the hook assembly of the at least one filter module. The two tightening assemblies are respectively mounted at the inlet side and the outlet side of the filter unit.

A replacement method for a filtration system in accordance with the present invention comprising the following steps:

an unlocking step: unlocking a tightening assembly of a holder module for separating the tightening assembly of the holder module and a filter module of a filter unit;

a separating step: opening a hook assembly of the filter module for separating the hook assembly of the filter module from a holder element of the holder module;

a replacement step: removing the filter module from the holder module and preparing a new filter module for replacement;

a connecting step: connecting the hook assembly of the new filter module on the holder element of the holder module; and a locking step: locking the tightening assembly of the holder module for tightening the tightening assembly and the new filter module.

Other objects, advantages and novel features of the invention will become more apparent from the following detailed description when taken in conjunction with the accompanying drawings.

DETAILED DESCRIPTION OF PREFERRED EMBODIMENT

Figure 1:
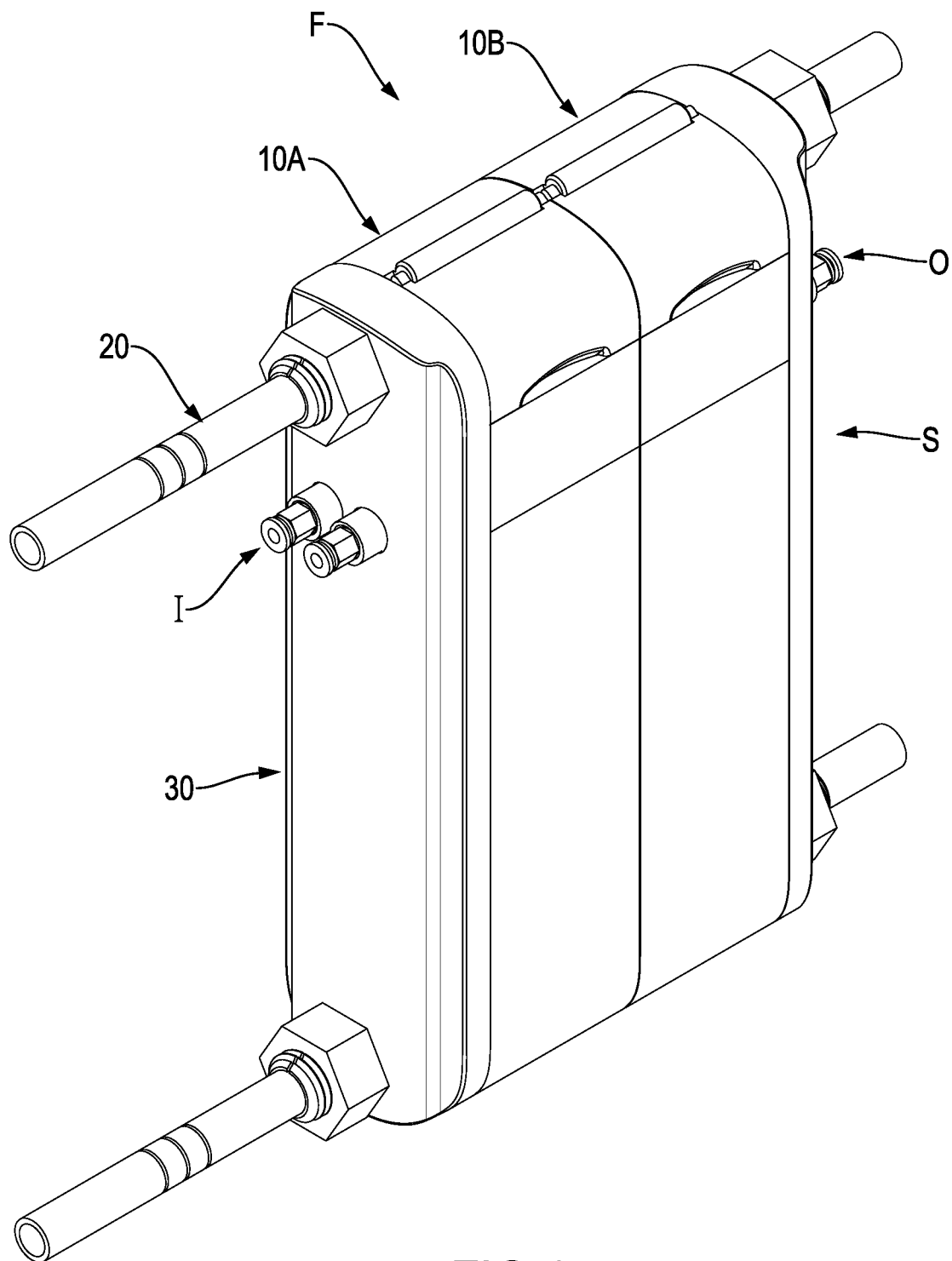
FIG. 1 is a perspective view of a filtration system in accordance with the present invention.

With reference to FIG. 1, a filtration system in accordance with the present invention comprises a filter unit F and a holder module S. The filter unit F has an inlet side I and an outlet side O being opposite each other, and has at least one filter module 10A, 10B. The holder module S fixes the filter unit F, and comprises at least one holder element 20 and two tightening assemblies 30. The at least one holder element 20 fixes the filter unit F. The two tightening assemblies 30 are respectively mounted at the inlet side I and the outlet side O of the filter unit F. Preferably, in the embodiment, the filter unit F has two filter modules 10A, 10B being adjacent and connected to each other, and the holder module S has two holder elements 20 being parallel to each other and respectively being defined as an upper holder element 20 and a lower holder element 20. Each tightening assembly 30 is connected with the two holder elements 20.

Figure 2:
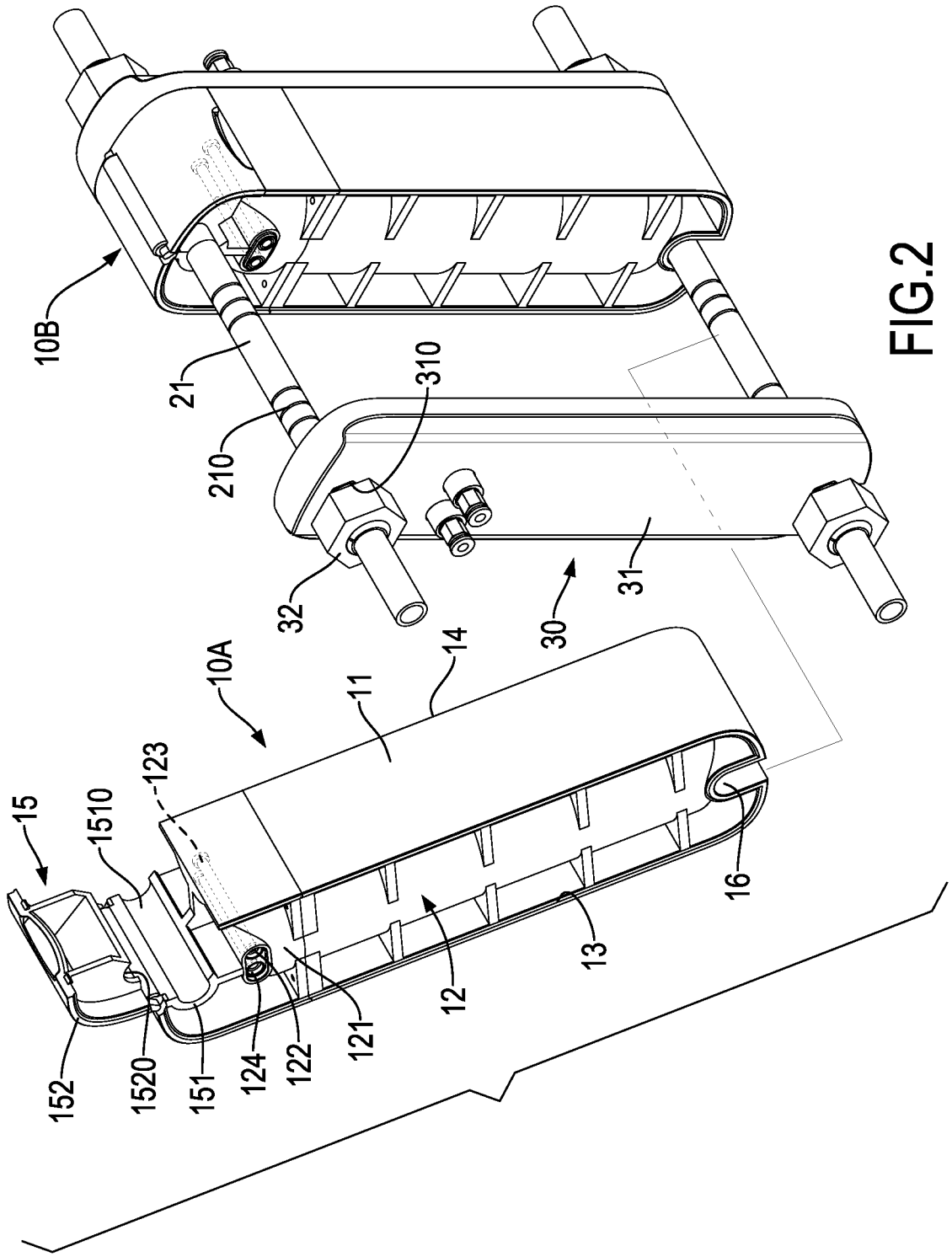
FIG. 2 is an exploded perspective view of the filtration system in FIG. 1.

With reference to FIGS. 1 and 2, each filter module 10A, 10B respectively has a housing 11, a filter 12, a first connecting surface 13, a second connecting surface 14, a hook assembly 15, and a fixing portion 16. The housing 11 is a cuboid with round corners. The filter 12 is mounted inside the housing 11. The first connecting surface 13 and the second connecting surface 14 respectively extend from opposite sides of the housing 11 and are parallel to each other. The first connecting surface 13 faces to the inlet side I, and the second connecting surface 14 faces to the outlet side O. Shapes of the first connecting surface 13 and the second connecting surface 14 correspond to each other, and each filter module 10A, 10B may be assembled by the connection of the first connecting surface 13 of one of the filter modules 10A, 10B and the second connecting surface 14 of the other filter module 10A, 10B. The hook assembly 15 is formed on the top of the housing 11 and has a hook 151 formed in the housing 11. A hook cover 152 is mounted pivotally on the top side of the hook 151. The hook assembly 15 may be opened by pivoting the hook cover 152. The hook 151 has a groove 1510 extending through the thickness direction of the housing 11. The hook cover 152 has a groove 1520, and the position of the groove 1520 of the hook cover 152 corresponds to the position of the groove 1510 of the hook 15. The fixing portion 16 is recessed on the bottom side of the housing 11.

With reference to FIGS. 1 and 2, the filter 12 is connected with and mounted in the housing 11, and has a cap 121, an inlet 122, an outlet 123, and a through hole 124. The inlet 122 and the outlet 123 are formed in the cap 121 and are opposite each other, and the through hole 124 is formed in the cap 121 and is parallel to the inlet 122 and the outlet 123. The material of the filter 12 may be fiber, activated carbon, resin, ceramics, maifan stone, copper zinc, or any combination thereof, and the filter 12 may filter water by the reverse osmosis membrane or the nanofiltration membrane.

With reference to FIGS. 1 and 2, each holder element 20 respectively has a rod 21. The rod 21 of each holder element 20 extends through the thickness direction of the filter unit S, and has multiple ditches 210 intervally recessed on and around the rod 21. The hook assembly 15 of each filter module 10A, 10B is connected to the rod 21 and is fixed on the ditches 210 of the rod 21. The hook assembly 15 and the fixing portion 16 of each filter module 10A,10B are respectively connected to the rods 21 of the holder elements 20 for fixing the position of each filter module 10A, 10B on the holder elements 20.

With reference to FIGS. 1 and 2, each tightening assembly 30 has a rectangular tightening plate 31 and a pair of fastening elements 32. The two tightening plates 31 of the two tightening assemblies 30 are respectively located at the inlet side I and the outlet side O of the filter unit F, and are respectively attached to the first connecting surface 13 of one filter module 10A and the second connecting surface 14 of the other filter module 10B. Each tightening plate 31 has two holes 310 respectively corresponding to the positions of the rods 21 of the holder elements 20, and is connected with the rods 21 of the holder elements 20 through the holes 310 of the tightening plate 31. The pair of fastening elements 32 is mounted on the rods 21 and is attached to and fastens the corresponding tightening plate 31 for tightening the two filter modules 10A, 10B.

The replacement method of the filtration system in accordance with the present invention has an unlocking step, a separating step, a replacement step, a connecting step, and a locking step.

Figure 3:
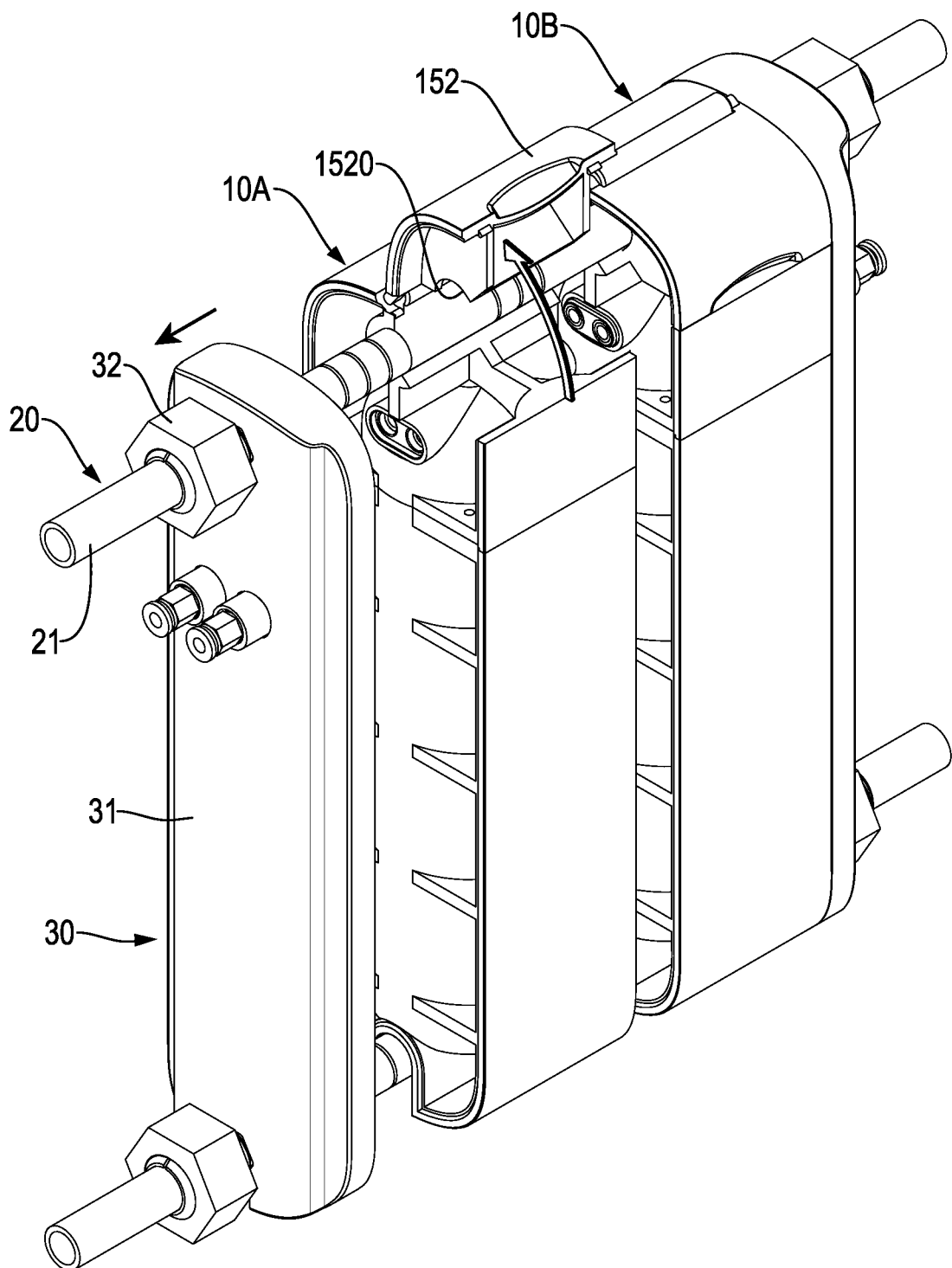
FIG. 3 is an operational perspective view of the filtration system in FIG. 1 showing a tightening assembly being unlocked.
Figure 4B:
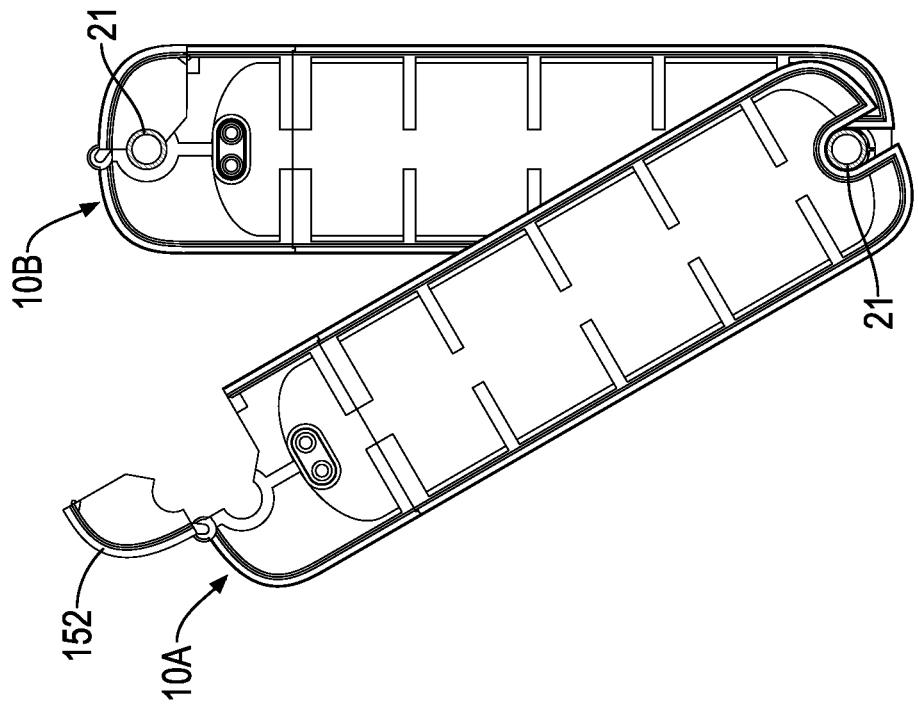
FIG. 4B is an operational cross sectional side view of the filtration system in FIG. 4 showing the filter module being turned away from the holder element.
Figure 4A:
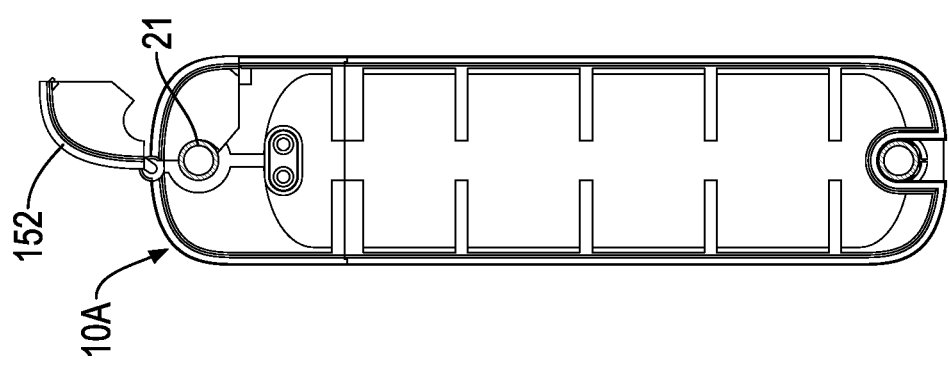
FIG. 4A is an operational cross sectional side view of the filtration system in FIG. 4 showing the hook cover of a filter module being opened.
Figure 4:
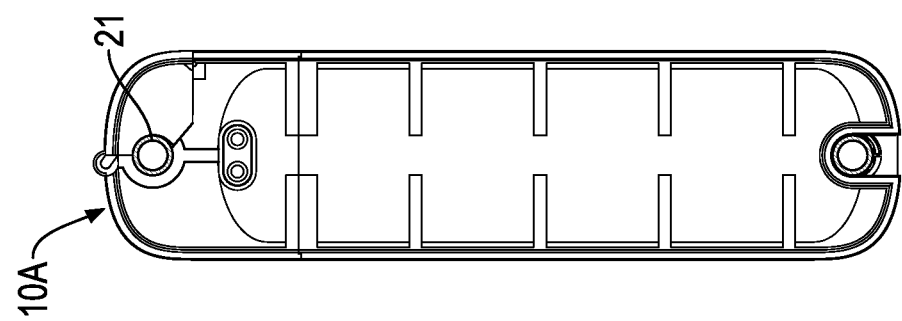
FIG. 4 is a cross sectional side view of the filtration system in FIG. 3.

With reference to FIGS. 3 and 4, the unlocking step is to loosen the pair of fastening elements 32 of one of the two tightening assemblies 30 for separating the pair of fastening elements 32, a corresponding one of the tightening plates 31 and the filter modules 10A,10B.

With reference to FIGS. 4 and 4A, the separating step is to open the hook cover 152 of the filter module 10A for disconnecting the groove 1520 of the hook cover 152 from the rod 21 of the upper holder element 20.

Figure 5:
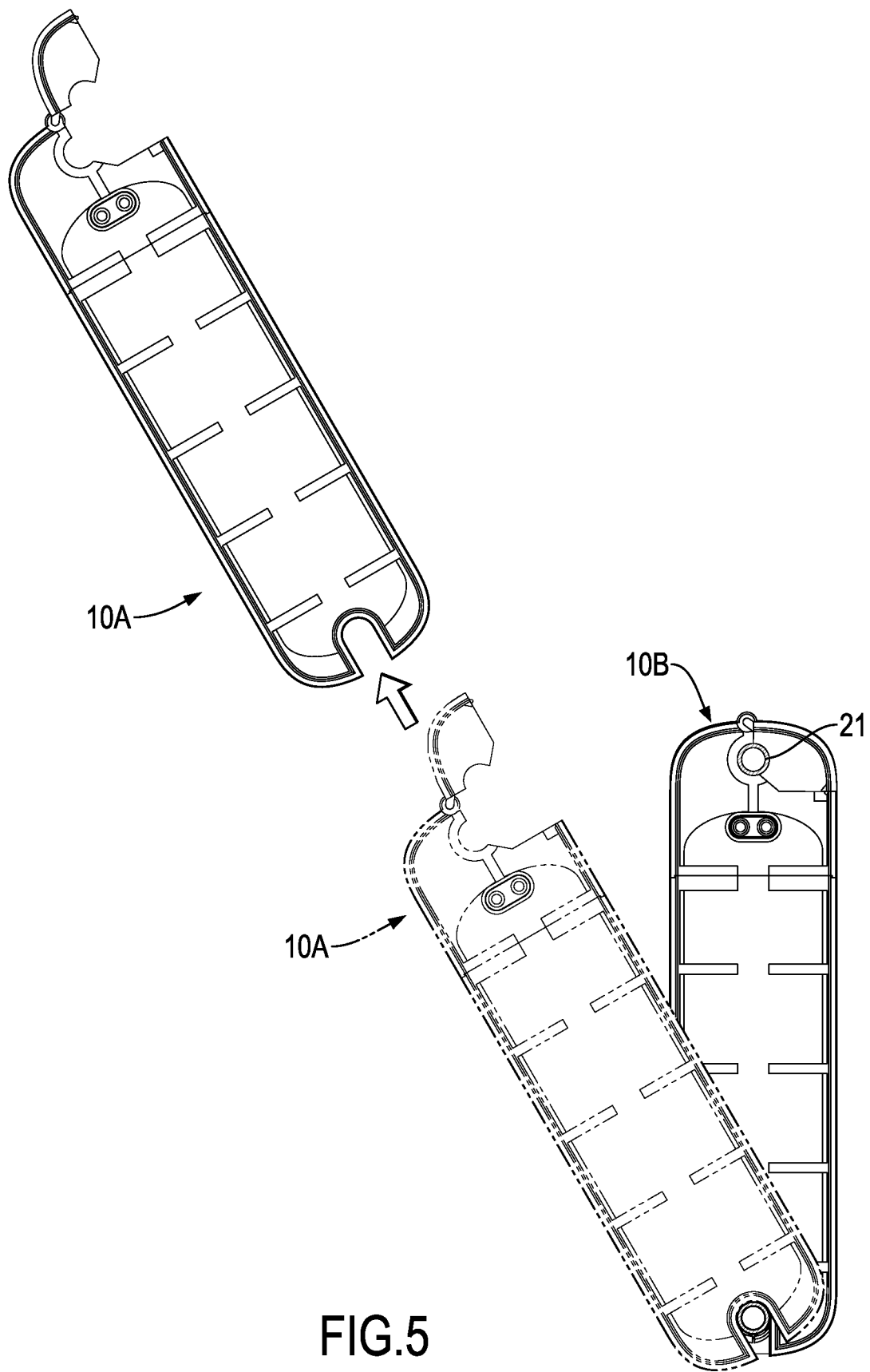
FIG. 5 is an operational cross sectional side view of the filtration system in FIG. 4 showing the filter module being removed.

With reference to FIG. 4B and FIG. 5, the replacement step is to remove the filter module 10A from the holder modules S after turning the filter module 10A away from the rod 21 of the upper holder element 20, and to prepare a new filter module 10C for replacement.

Figure 6:
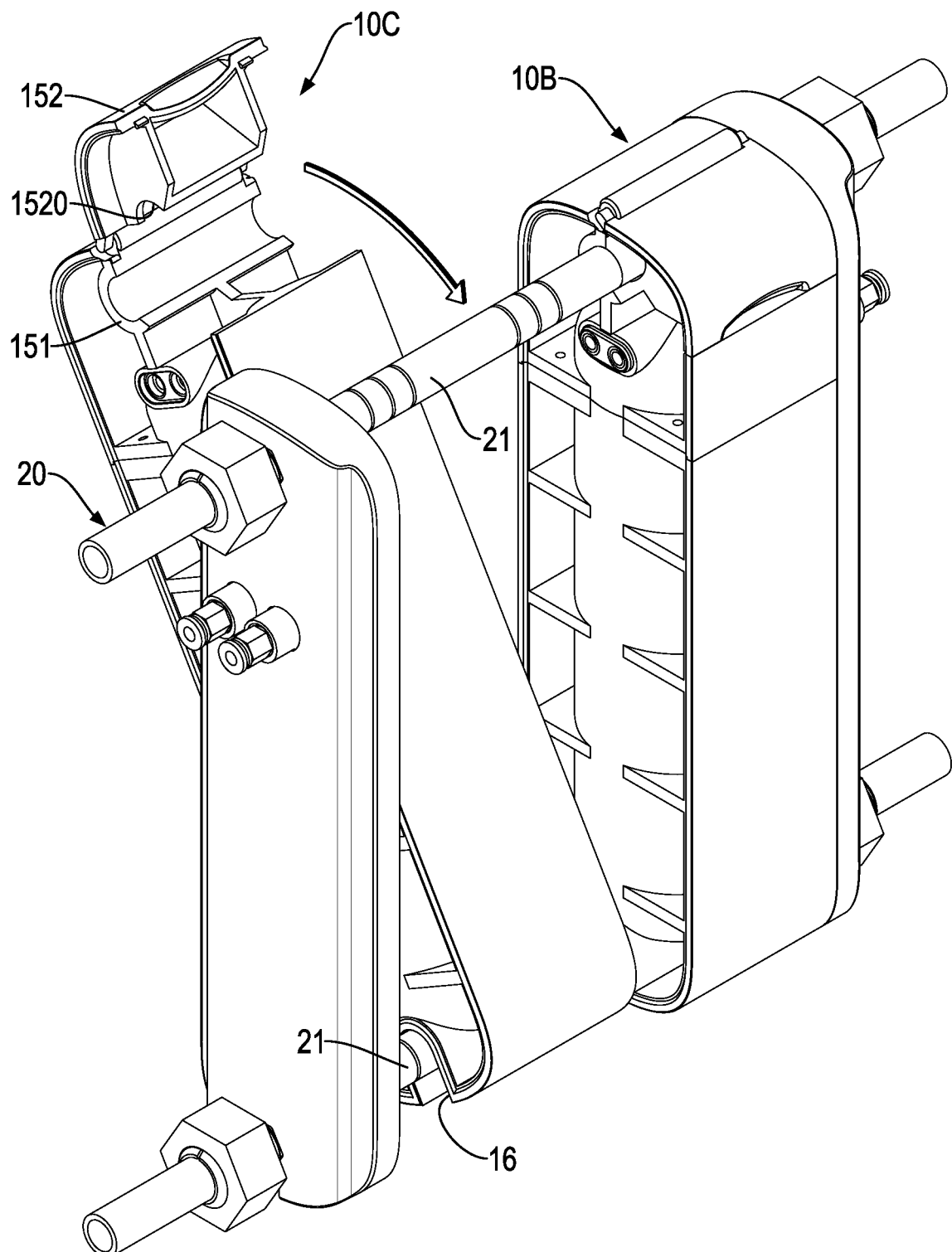
FIG. 6 is an operational perspective view of the filtration system in FIG. 5 showing a new filter being connected to the holder elements.

With reference to FIG. 6, the connecting step is to insert the fixing portion 16 of a new filter module 10C to the rod 21 of the lower holder element 20, hook the hook 151 of the hook assembly 15 of the new filter module 10C to the rod 21 of the upper holder element 20, and close the hook cover 152 for connecting the hook 151 and the hook cover 152 of the hook assembly 15 around the rod 21 of the upper holder element 20 closely. Then the filter module 10C is fixed between the rods of the two holder elements 20.

With reference to FIGS. 2 and 3, the locking step is to fasten the fastening elements 32 for tightening the connection of the tightening plates 31 and the filter modules 10B,10C.

Figure 7:
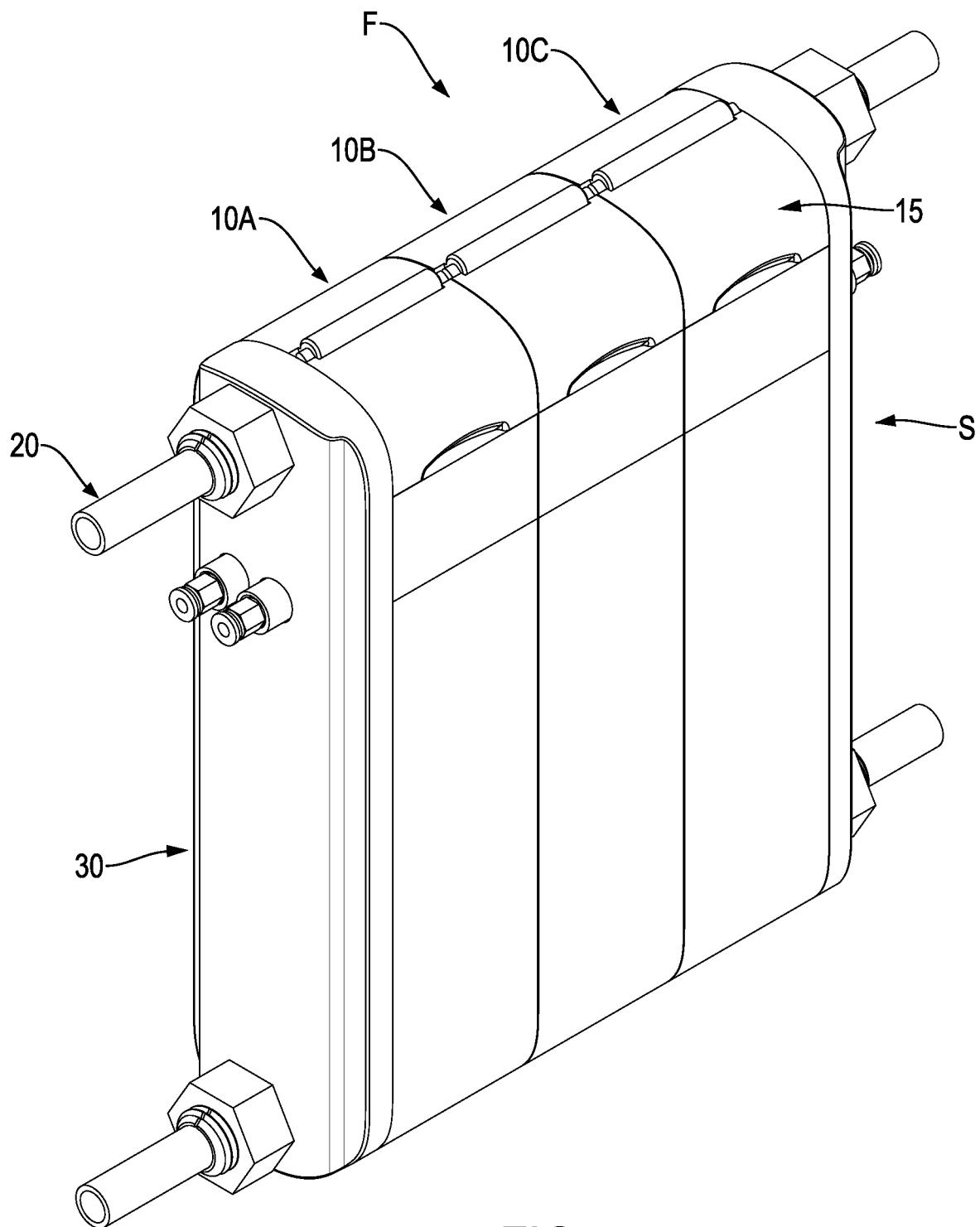
FIG. 7 is a perspective view of the filtration system in FIG. 1 showing three filter modules being assembled on the holder module.

With reference to FIG. 7, according to the demand of the user, another filter module 10C may be increased to the filter unit F by the above steps without removing the filter module 10A, so the assembly and the replacement processes of the filter system of the present invention are simple and fast.

With such an arrangement, the quantities of the filter modules 10A, 10B, 10C of the filter unit F of the filtration system in accordance with the present invention may be increased or decreased according to the demand of the user, the position of each filter module 10A, 10B, 10C may be fixed after adjustment, and each filter module 10A, 10B, 10C may be connected to any desired position on the holder modules S. The length of each filter module 10A, 10B, 10C may be selected to correspond to the perpendicular distance between two of the parallel holder elements 20.

Moreover, each filter module 10A, 10B, 10C has the hook assembly 15 for connecting to the holder elements 20 of the holder module S quickly. The two tightening assemblies 30 are tightening the connection of the filter unit F and the holder module S, so the leaking problem will be reduced.

In addition, with the replacement method of the present invention, the quantities and positions of the filter module 10A, 10B, 10C can be adjusted quickly, and the replacement of each filter module 10A, 10B, 10C is very simple.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A filtration system comprising:
   a filter unit having
      an inlet side,
      an outlet side being opposite the inlet side, and
      at least one filter module, each one of the at least one filter module having
         a housing having two sides,
         a filter mounted inside the housing,
         a hook assembly formed in a top side of the filter module, the hook assembly having a hook formed in the housing, and a hook cover mounted pivotally on the hook of the hook assembly,
         a first connecting surface formed on one of the sides of the housing, and
         a second connecting surface formed on the other side of the housing and being parallel to the first connecting surface; and
   a holder module fixing the filter unit and having at least one holder element fixing the filter unit and connected with the hook assembly of the at least one filter module; and two tightening assemblies respectively mounted at the inlet side and the outlet side of the filter unit.

2. The filtration system as claimed in claim 1, wherein each of the tightening assemblies has one tightening plate and a pair of fastening elements attached to the tightening plate.

3. The filtration system as claimed in claim 1, wherein the at least one holder element includes multiple holder elements, and a length of each one of the at least one filter module corresponds to a perpendicular distance between two of the holder elements.

4. The filtration system as claimed in claim 1, wherein the material of the filter of each one of the at least one filter module is selected from fiber, activated carbon, resin, ceramics, maifan stone, copper zinc, or any combination thereof.

* * * * *